US006563349B2

(12) United States Patent
Menezes et al.

(10) Patent No.: US 6,563,349 B2
(45) Date of Patent: May 13, 2003

(54) MULTIPLEXOR GENERATING A GLITCH FREE OUTPUT WHEN SELECTING FROM MULTIPLE CLOCK SIGNALS

(75) Inventors: Vinod Menezes, Karnataka (IN); Rajith Kumar Mavila, Austin, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/891,541

(22) Filed: Jun. 27, 2001

(65) Prior Publication Data

US 2003/0001612 A1 Jan. 2, 2003

(51) Int. Cl.$^7$ ............................................... H03K 17/00
(52) U.S. Cl. ......................... 327/99; 327/407; 327/298; 327/299; 326/93; 326/96; 331/49
(58) Field of Search ..................... 327/99, 298, 299, 327/407; 326/93, 96

(56) References Cited

U.S. PATENT DOCUMENTS 4,853,653 A * 8/1989 Maher ......................... 331/49
6,084,441 A * 7/2000 Kawai ......................... 327/99
6,107,841 A * 8/2000 Goodnow ..................... 327/99
6,239,626 B1 * 5/2001 Chesavage ................... 327/99
6,265,930 B1 * 7/2001 Walker et al. ............... 327/407
6,323,715 B1 * 11/2001 Vatinel ........................ 327/407

\* cited by examiner

Primary Examiner—Michael Tokar
Assistant Examiner—Vibol Tan
(74) Attorney, Agent, or Firm—Robert D. Marshall, Jr.; W. James Brady, III; Frederick J. Telecky, Jr.

(57) ABSTRACT

A multiplexor generating a glitch free output. A slower clock signal and sleep clock signal are respectively synchronized with positive and negative edges of the faster clock signal. The sleep signal is further synchronized with a negative edge of the slower clock signal and provided to an AND gate gating the slower clock signal based on the value of a select signal formed by the synchronized sleep signal. The slower clock signal is delayed by a number of faster clock cycles equal to the time taken by the select signal to be received at the AND gate after the sleep signal is synchronized to the slower clock signal. In an alternative embodiment, a signal control block ensures that the 0 to 1 transition on one of the select signals follows the 1 to 0 transition on another select signal when the value of the sleep signal changes. In addition, each select signal is synchronized with a negative edge of the corresponding clock signal selected.

17 Claims, 5 Drawing Sheets

MULTIPLEXOR GENERATING A GLITCH FREE OUTPUT WHEN SELECTING FROM MULTIPLE CLOCK SIGNALS

BACKGROUND OF THE INVENTION

1. Field of the Invention

The present invention relates to integrated circuit design, and more specifically to a method and apparatus for generating a glitch free output when selecting from multiple clock signals.

2. Related Art

A need often exists to select from multiple clock signals. For example, a device may operate using one of two clock signals having different speeds (i.e., clock period), with a slower clock signal typically being used to consume lower electrical power in durations of inactivity of the device. Thus, a higher speed clock signal may be used during normal operation and the lower speed clock signal may be used during periods of inactivity. Accordingly, the device may need to select from among multiple clock signals, and the selected output may be used to drive several other components of the device.

A multiplexor is often used to perform the selection operation. The multiplexor may receive several clock signals ("input clock signals") as input and select one of the clock signals depending upon the value of a selection input. For simplicity of understanding it is hereafter assumed that the multiplexor receives only two clock signals, and the selection input accordingly is a binary number. However, the present invention may be used in conjunction with more than two clock signals provided as inputs. Depending on the state of the select signal (high or low) one of the two clock signals is selected to generate the output clock signal.

A glitch can result in the output clock signal particularly when a phase relationship does not exist between the input clock signals. A glitch generally refers to a pulse of a short duration. A glitch typically occurs when the multiplexor changes the selection in a short duration after a prior transition of the output signal.

Glitches are generally undesirable in that the components driven by an output signal may be implemented under the assumption that the output signal would only have pulses of at least a pre-specified duration. Glitches having a duration of less than the pre-specified duration can lead to unpredictable or erroneous results, and are thus undesirable.

Therefore, what is needed is a method and an apparatus which generates a glitch-free output when selecting from multiple input clock signals. In addition, it may be desirable to consume minimal electrical power when generating the output at least in environments (e.g., mobile devices operating from batteries) where minimizing power consumption is of particular interest.

SUMMARY OF THE INVENTION

A clock generation circuit provided in accordance with the present invention generates a glitch free output when selecting from among multiple clock signals. In an embodiment, the clock generation circuit selects either a faster clock signal or a slower clock signal depending on the logical value of a sleep signal. The sleep signal specifies whether the faster clock or the slower clock signal is to be selected.

The clock generation circuit may contain two AND gates, with a first AND gate passing through (gating) the slower clock signal if a first select signal is at high logical value. The second AND gate may pass the faster clock signal if a second select is at a high logical value. An OR gate performs a logical OR operation of the outputs of the two AND gates. A signal control block delays some of the select signal, the faster and slower clock signals to ensure that glitches are not generated on the output of any of the three gates (i.e, two AND gates and an OR gate) as described below.

According to an aspect of the present invention, the signal control block generates the two select signals such that at least a desired delay exists between transitions on the first select signal and the slower clock signal. Similarly, the second select signal is generated such that at least the desired delay exists between transitions on the second select signal and the faster clock signal. The desired delay determines the minimum pulse width. As a result, glitches (with a pulse width less than the determined minimum pulse width) are absent at the output of the AND gates.

According to another aspect of the present invention, the signal control block introduces delays into at some of the first select signal, the second select signal, the slower clock signal and the faster clock signal to avoid the occurrence of a high to low transition on one input followed by low to high transition on another input of the two inputs of the OR gate within a desired duration. As a result, glitches are eliminated at the output of the OR gate also.

In one embodiment, the signal control block comprises a first synchronizer synchronizing the sleep signal with a negative edge of the faster clock signal to generate the second select signal. An inverter inverts the second select signal to generate an inverted output. A second synchronizer synchronizes the inverted output with a negative edge of the faster clock signal to generate the first select signal.

The signal control block may further include a third synchronizer to synchronize the sleep signal with a negative edge of the slower clock signal to generate an output. The output of the third synchronizer is provided as an input to the first synchronizer. A fourth synchronizer synchronizes the slower clock signal with a positive edge of the faster clock signal to generate an output. The output of the fourth synchronizer being provided as an input to the first AND gate. As a result of the connections, the sequencing of the transitions on the slower and faster clock signals are controlled to avoid glitches at the output of the OR gate as well.

In an alternative embodiment, the signal control block ensures that a 1 to 0 transition on one of the first select signal and the second select signal precedes a 0 to 1 transition on another one of the first select signal and the second select signal, with the two transitions occurring in response to a change in value on the sleep signal. Such a feature ensures that glitches are not generated by the OR gate (when each AND gate does not generate a glitch).

The clock generation circuit of the alternative embodiment may contain two synchronizers, a third AND logic gate and an NOR gate. The third AND gate generates an output by performing an AND logical operation of an inverted value of the output of the second synchronizer and the sleep signal. The output of the third AND logic gate is provided as an input to the first synchronizer. The NOR logic gate performs a NOR logical operation of the sleep signal and the output of the first synchronizer, and the resulting output is provided as an input to the second synchronizer.

The first synchronizer may generate the first select signal by synchronizing the input signal to a negative edge of the faster signal. The second synchronizer is designed to generate the second select signal by synchronizing the input to the negative edge of the slower clock signal. Due to the synchronization, glitches are avoided at the output of the AND gates. Due to the feedback loop (resulting from the above connections), the 0 to 1 transition on one select line always follows the 1 to 0 transition on the other select line. A short dead period (i.e., no clock signal generated) may be present on the output of the AND gate between the two transitions, but such a situation may be acceptable when glitches are avoided.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

The present invention allows a glitch free output to be generated when selecting between multiple input clock signals having no phase relationship. A multiplexor in accordance with the present invention can be implemented using multiple AND logic gates and an OR logic gate, with each AND logic gate performing a logical AND operation of one of the clock signals with a corresponding select signal. The OR logic gate selects one of the outputs of the AND gates. In general, a logic gate may be implemented using any combination of several types of gates. For example, as is well known, any logic gate can be implemented using XOR gates.

The timing of the transitions on the inputs to each of the gates may be controlled to provide a glitch free output. The considerations underlying the timing relationships are described first. Example environments implementing the invention are described then.

2. General Considerations

Figure 3:
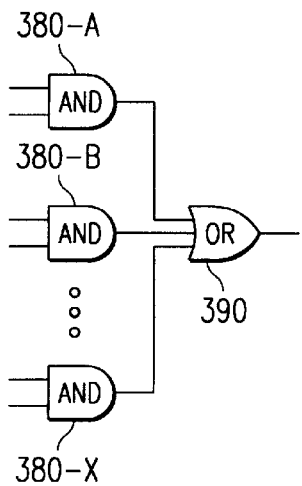
FIG. 3 is a block diagram of the details of a multiplexor illustrating the principles of operation of the described embodiments.

FIG. 3 is a block diagram illustrating the considerations underlying the timing relationships of the various signals used in a multiplexor implemented in accordance with the present invention. The block diagram is shown containing several AND gates 380-A through 380-X, and OR gate 390. The use and operation of each of the gates is described below.

Each AND gate receives a clock signal and a corresponding select signal, and the clock signal is gated to the output when select signal is high. OR gate 390 receives the outputs of the AND gates as inputs and performs a logical OR operation on the inputs. The properties of AND gates and OR gates are examined to appreciate the manner in which glitches may be avoided at the output of OR gate 390.

Assuming an AND gate has two inputs A and B, there are five relevant possible scenarios with respect to transitions on the two inputs:

i) one input (e.g., A) going from low logical value to a high logical value followed by another input going from low logical value to a high logical value;

ii) both inputs continue to be at a high logical value;

iii) one of the two inputs continues to be at a low logical value;

iv) one of the inputs goes from high to low and then another input goes from low to high; and v) one of the inputs goes from low to high followed by (or simultaneously with) another input going from high to low.

It may be readily appreciated that only in situation (v) of above, a glitch could result in the output of the AND gate. Accordingly, with respect to FIG. 3, the timings of the clock signal and the corresponding select signal are controlled to ensure that at least some delay exists between the transitions of the two inputs to each of the AND gates 380-A through 380-X. In an embodiment described below, a delay of half a clock cycle is ensured by synchronizing one of the inputs to a positive edge of a clock signal and another input to a negative edge of a clock cycle.

With respect to OR gates, assuming the OR gate also has two inputs, there are the following relevant scenarios:

A) One of the two inputs goes from a low logical value to a high logical value followed by the second input going from a low logical value to a high logical value;

B) One of the two inputs goes from a low logical value to a high logical value followed by (or simultaneously with) the second input going from a high logical value to a low logical value; and C) If one of the two inputs goes from a high logical value to a low logical value followed by the second input going from a low logical level to a high logical level.

It may be readily appreciated that only in situation (C) of above, a glitch results in the output of the OR gate. Accordingly, the timings of the inputs to the AND gates may also be controlled to ensure that the transitions on the two clock signals do not occur as in situation (C), at least when the selection is to be switched from one clock to the other. Based on the above principles, the manner in which a multiplexor may generate a glitch free output is described with reference to FIG. 4.

3. Method

Figure 4:
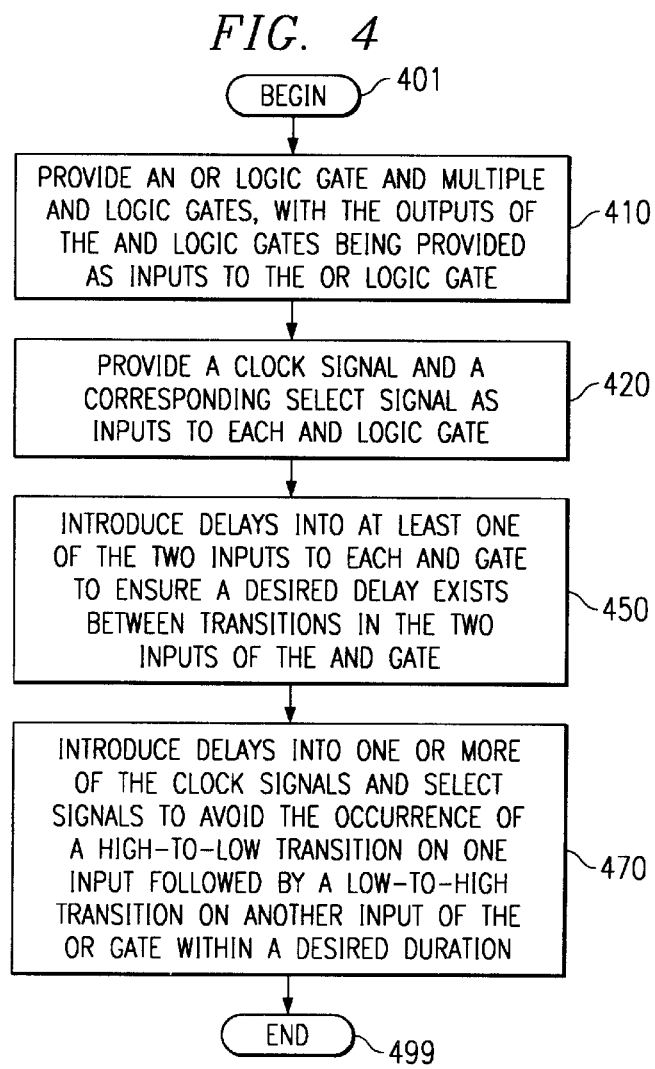
FIG. 4 is a flow chart illustrating a method in accordance with the present invention.

FIG. 4 is a flow-chart illustrating a method in accordance with the present invention. The method is described with reference to FIG. 1 for illustration. The method begins in step 401, in which control passes to step 401. In step 410, multiple AND gates and OR gates may be provided, with the outputs of the AND gate being provided as an input to the OR gate. A scenario when two AND gates are connected to an OR gate is depicted in FIG. 3.

In step 420, a clock signal and a corresponding select signal are provided as inputs to each of the AND dates. Thus, each clock signal is gated to the output of the corresponding AND gate when the corresponding select signal is at a logical high state.

In step 450, delays are introduced into at least one of the two inputs to each AND gates to ensure that at least a desired delay exists between the two inputs. Accordingly, situation (iv) noted in the above section may be avoided.

In step 470, delays are introduced into one or more of the clock signals and select signals to avoid a hightolow transition on one input followed by a low-to-high transition on another input of the OR gate within a desired duration. Steps 450 and 470 may need to be designed taking into consideration the effect of each other. The method ends with step 499 Some example approaches for designing steps 450 and 470 are described below in further details.

Several aspects of the invention are described below with reference to example environments for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

4. Example Environment

Figure 1:
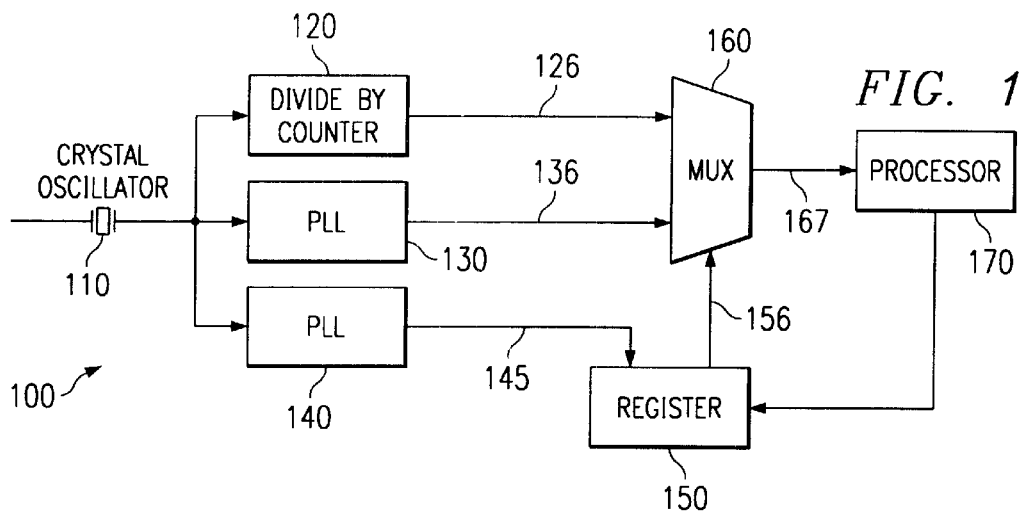
FIG. 1 is a block diagram illustrating an example environment in which the present invention can be implemented.

FIG. 1 is a block diagram illustrating an example environment in which the present invention can be implemented. There is shown crystal oscillator 110, a divide by counter 120, two PLLs (phase locked loops) 130 and 140, register 150, multiplexor (MUX) 160 and processor 170. Each component is described below in further detail.

Oscillator 110 may be implemented using a quartz crystal which oscillates to generate a clock signal. In one embodiment, the clock signal has a frequency of 50 MHz. Output clock signal of crystal oscillator 110 is provided as an input simultaneously to a divide by counter 120, PLL 130 and PLL 140.

Divide by counter 120 receives a clock signal of 50 MHz frequency and generates a 10 MHz clock signal 126 in a known way. PLL 130 receives 50 MHZ clock signal and generates a faster clock signal 136 with frequency of 60 MHz. PLL 140 receives 50 MHz clock signal and generates a clock signal 145 with a frequency of 80 MHz.

Register 150 operates using 80 MHz clock signal 145 received from PLL 140. A bit in register 150 may be set by processor 170, and the bit may be provided on sleep signal line 156. The bit may be set depending on the specific one of the two input signals 126 and 136 required to be used to drive processor 170. For example, 10 MHz clock signal 126 may be used during periods of inactivity and 60 MHz clock signal 136 during normal operation as described below.

MUX 160 generates output 167 by selecting either 10 MHz signal 126 or 60 MHz signal 136 under the control of sleep signal 156. When the value received on sleep signal 156 changes, MUX 160 provides a corresponding different input signal on output 167. The manner in which MUX 160 may generate a glitch free output (meeting the criteria (v) and (C) of above) while selecting from the input clock signals is described below.

5. Multiplexor

Figure 2:
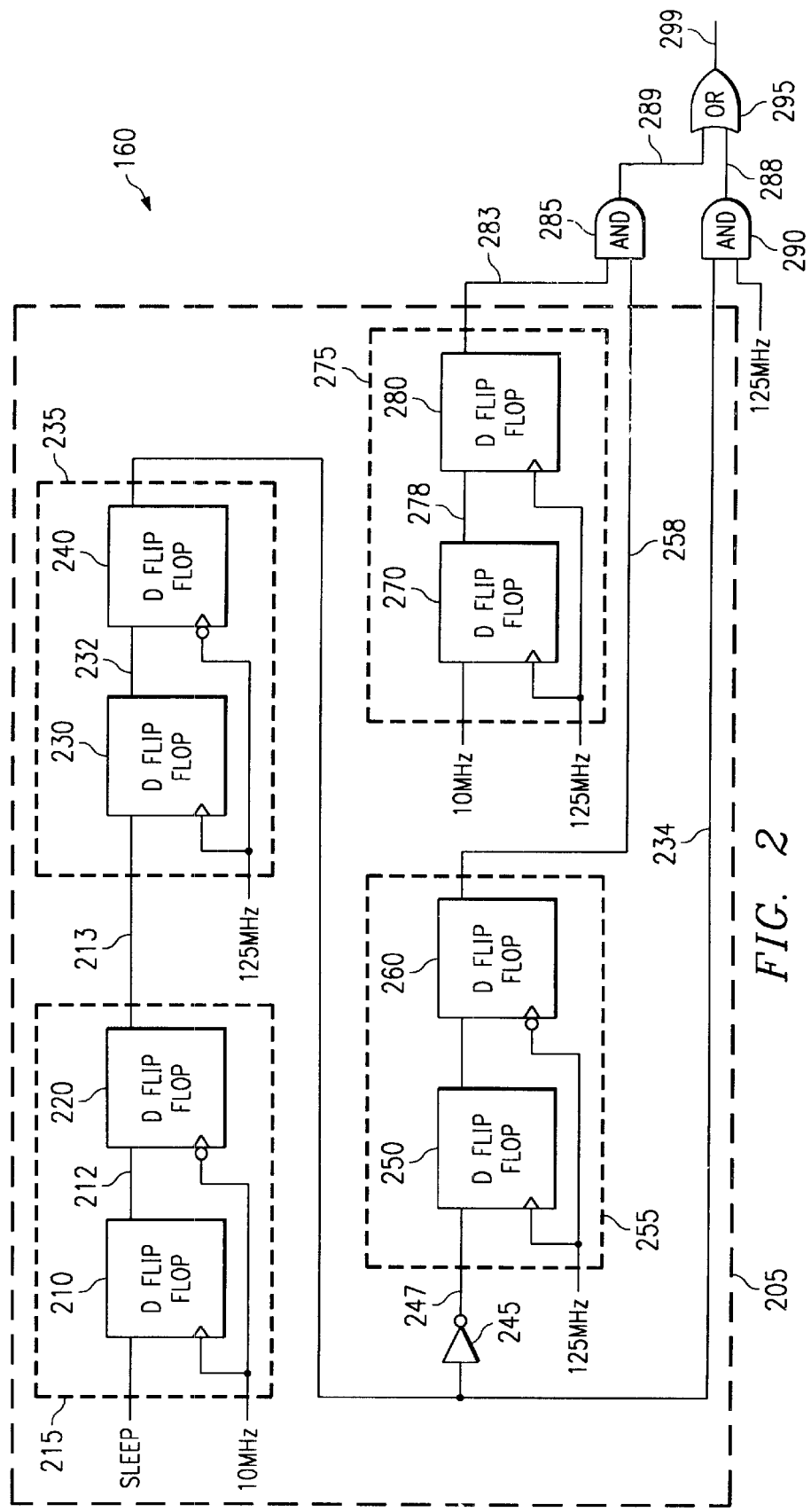
FIG. 2 is a block diagram illustrating the details of an embodiment of a multiplexer provided in accordance with the present invention.

FIG. 2 is a block diagram of an embodiment of MUX (multiplexor) 160 illustrating the details as relevant to an understanding of several aspects of the present invention. MUX 160 is shown containing signal control block 205, synchronizer 275, AND gates 285, AND 290 and OR gate 295. The manner in which the two criteria (v) and (C) are met can be better appreciated based on an understanding the operation of the individual components.

Synchronizer 275 synchronizes the slower clock signal (10 MHz clock signal in this example) with the positive edge of the fastest clock signal to generate a slower synchronized clock signal. The positive edge represents a different edge than the edge (i.e., negative) used for synchronization in signal control block 205. Synchronization with different edges enables transitions of the two inputs to each AND gate 285 and 290 to occur at different instances of time, thereby preventing (situation V noted above) glitches at the outputs of the AND gates. In an embodiment, synchronizer 275 contains two positively triggered D flip flops 270 and 280 connected in series and clocked by the positive.

AND gate 285 performs a logic AND operation of the slower synchronized clock signal on path 283 and inverted synchronized sleep signal on path 258. As described above, the signal on path 283 is synchronized to a positive edge of the faster clock signal and the signal on path 258 is synchronized to a negative edge of the same clock signal. As a result, the transitions on the two signals are separated by at least half a clock period of the fastest clock signal, and the possibility of a glitch at output 289 is eliminated.

AND gate 290 receives fastest (60 MHz) clock signal and synchronized sleep signal 234 as inputs. As the synchronized sleep signal 234 is synchronized with a negative edge of the fastest clock signal and as the fastest clock signal always transitions to a logical high on a positive edge, a lag of half a clock period of the fastest clock signal is ensured in the inputs of AND gate 290. Due to the lag, glitch is avoided at output 288.

OR gate 295 generates a logical OR value of outputs 288 and 289. As described above, the two output signals are generated to be glitch free. In addition, situation (C) is avoided by the appropriate design of signal control block 205 as described below.

6. Signal Control Block

Continuing with reference to FIG. 2, signal control block 205 is shown containing synchronizers 215, 275 and 235, NOT gate 245, and delay module 255. Each component is described below. The operation of the individual components is described before describing the manner in which situation (C) is avoided.

Synchronizer 215 synchronizes sleep signal first with a positive edge of the slower clock signal and then with the negative edge of the slower clock signal. In an embodiment, synchronizer 215 contains D flip flops 210 and D flip flop 220 connected in series. D flip flop 210 is positively clocked, thereby synchronizing sleep signal with the positive edge of the slower clock. D flip flop 220 is clocked by inverted slower clock (negatively triggered), thus synchronizing sleep signal with the negative edge of the slower clock signal. The resulting synchronization delays the switch of selection from one clock signal to the other, but facilitates prevention of glitches as described below in further detail.

Synchronizer 235 synchronizes sleep signal with the negative edge of 60 MHz clock signal. In an embodiment, synchronizer 235 may contain a positively triggered D flip flop 230 and a negatively triggered D flip flop 240. D flip flop 230 synchronizes sleep signal with the positive edge of the fastest clock and D flip flop 240 synchronizes sleep signal with the following negative edge of the fastest clock.

NOT gate 245 inverts sleep signal 234. As the inversion operation introduces a delay on the sleep signal, synchronization may be lost, hence inverted sleep signal 247 needs to be synchronized with fastest clock signal. Delay module 255 synchronizes inverted sleep signal 247 with the negative edge of fastest clock signal. Synchronizing with the negative edge ensures that the inputs to AND gate 285 transition with at least half a clock cycle (of the fastest clock) delay because synchronizer 275 synchronizes the slower clock signal to the positive edge of the fastest clock.

Synchronizer 275 contains the same number (here 2) of delay elements (270 and 280) as the number of synchronizers (here 235 and 255). The delay elements are triggered by the positive edges of the faster clock signals. As a result, the negative transition of the delayed slower clock signal on line 283 occurs half a clock cycle before the 1 to 0 transition of the select signal. The manner in which the components of above operate to avoid the situation C of above is described below.

7. Avoiding Situation C in Embodiment of FIG. 2

Two situations when the sleep signal transitions from 0 to 1, and then from 1 to 0 are considered. In either case, the transitions are synchronized by synchronizers 215 and 235 to the slower clock signal and then the faster clock signal respectively. The synchronized sleep signal is provided on line 234.

When the synchronized sleep signal changes from 1 to 0, both AND gates 285 and 290 are disabled for a short duration. As a result, neither of the two clock signals is provided as an output of OR gate 299. The resulting 'dead period' (i.e., no clock signal) may be acceptable. In addition, as the select signals and the slower clock signal are synchronized with the fastest clock signal, pulses having a minimum duration equal to the duration of the high or low levels of the fastest clock signal are generated, and thus glitches are not generated.

When the synchronized sleep signal changes from 0 to 1, the select signals (258 and 234) are both at a high logical level for a short duration. However, synchronization operations performed by the various synchronizers causes a high logical level to be extended to longer duration that the duration provided by the slower clock signal as described below in detail.

The operation of synchronizer 215 causes 1 to 0 (the inverted sleep signal) transition on line 258 to occur slightly after (at least two clock cycles of the faster clock signal) a negative edge of the (un-delayed) slower clock signal. Thus a pulse width of at least two clock cycles is guaranteed when the slower clock signal is selected. The slower clock signal is also delayed by similar amount during synchronization (to the positive edge of the faster clock) by synchronizer 275.

The effect of the synchronization(s) and delays is that the select signal on line 258 transitions to 0 on a negative edge of the faster clock signal. Thus, both the faster clock signal generated on line 288 and the delayed slower clock signal generated on line 289 transition to a lower level at the same time point. From that point on, the faster clock signal is provided on output 299. A glitch is thus avoided.

It may be further noted that the switch from the slower clock signal to the faster clock signal lags the change in value on the sleep signal. The lag is due to the synchronization by various synchronizers as described above. As also noted above, the lag is typically acceptable if the glitches are prevented. A timing diagram further illustrating the operation of the components of FIG. 2 and the avoidance of situation (C) is described below.

8. Timing Diagram

Figure 6:
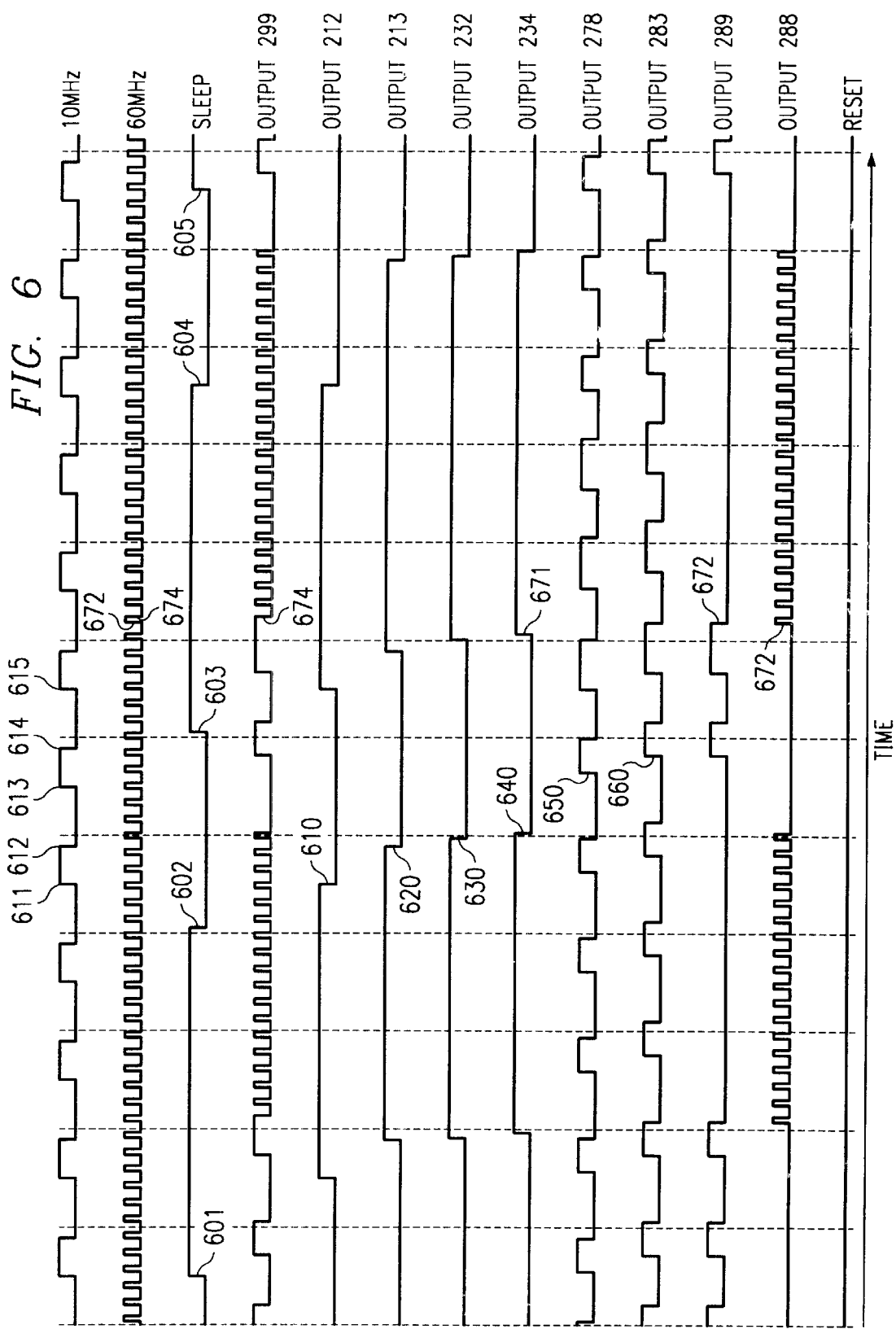
FIG. 6 is a timing diagram representing the various states of signals of the embodiment(s) of FIG. 2.

FIG. 6 is a timing diagram illustrating the timing relationships of various signals generated in the embodiment of FIG. 2. The inputs to MUX 160 are labeled as 10 MHz (slower clock signal) and 60 MHz (faster clock signal) signals. The sleep signal which controls the selection of the input signals is shown with several transitions 601–605. The effect of transitions of sleep signal from logical 1 to 0 is described with reference to transition 602. Then, the transition from 0 to 1 of the sleep signal is described with reference to transition 603.

With reference to transition (1 to 0) 602, D flip flop output 212 is shown delaying the transition of sleep signal at time point 602 to time point 610. Output 213 is generated by D flip flop 220 and is synchronized to the negative edge of the 10 MHz clock signal. Due to the delay introduced by D flip flop 220, the transition at time point 610 is shown further delayed to time point 620. Time point 620 occurs at the same time as time point 612 at which a negative transition of the slower clock signal (10 MHz occurs).

Outputs 232 and 234 respectively represent the sleep signal further delayed due to synchronization with the positive and then with the negative edge of the fastest clock signal. The select clock signal is shown delayed to time points 630 and 640 respectively. Time point 640 occurs during a period when the slower clock signal is at a low logical level, as also noted above.

The slower clock signal (10 MHz) which is enabled when the device is inactive is shown with several transitions 611–615. The description is continued with respect to transition 613. Output 278 is generated by D flip flop 270 and is synchronized the positive edge of 60 MHz clock signal. D flip flop 270 is shown delaying the transition of the slower clock signal at time point 613 to time point 650. Output 283 is generated by D flip flop 280 and is synchronized to the next positive edge of 60 MHz clock signal. D flip flop 280 further delays the transition at time point 650 to time point 660.

Output 289 is that of AND gate 285 which is enabled only when the corresponding select signal 258 is at a high logical level. Similarly, AND gate 290 generates output 288 when the corresponding select signal 234 is at a high logical level.

Thus, immediately after time point 640 (when the synchronized sleep signal goes low), the faster clock signal is shown being disabled on output 299. Between time points 640 and 660 (the occurrence of the first positive edge of the delayed slower clock signal after time point 640), no clock signal is generated on output 299, and represents the dead period noted above. Due to the dead period, situation (C) noted above is avoided.

With respect to transition (0 to 1) 603, transition 603 is shown delayed to time point 671 (and provided on line 234) by the operation of synchronizers 215 and 235. The select signals corresponding to AND gates 285 and 290 are both at a high logical level for a duration of one clock cycle of the faster clock signal as may be deduced from analysis of inverter 245 and synchronizer 255. Situation (C) is avoided as (described above) illustrated below.

Select signal 258 corresponds to inverted value of output 234 delayed by one clock cycle of the fastest clock signal. During that one clock cycle, both the select signals 258 and 234 are at a high logical value. Thus, between time points 671 and 672, both the select signals are at a high logical value.

As the slower clock signal generated on line 283 (input to AND gate 285) is synchronized with a positive edge of the faster clock signal, the high level to low level transition on line 283 occurs only at a negative transition of the faster clock signal after time point 672. The operation of synchronizer 275 is shown extending the high logical level of signal on line 289 to time point 672.

Thus, at time point 672, the slower clock signal ceases to provide the high logical level on output 289 (and thus 299 also). However, between time points 672 and 674, the faster clock signal provides the high logical level for the output 299. Accordingly, the high logical level is extended until time point 674.

Thus, a glitch free output is generated by OR gate 295 and is the output of MUX 160. Thus, when sleep signal is high, faster clock is generated by MUX 160, and when sleep signal is low, slower clock is generated by MUX 160. As noted above, MUX 160 switches between the two clocks a little after sleep signal switches from high to low or vice versa.

It should be understood that several alternative embodiments of MUX 160 can be implemented without departing from the scope and spirit of the present invention. An example alternative embodiment is described below in further detail.

9. Alternative Embodiment of Multiplexor (MUX)

Figure 5:
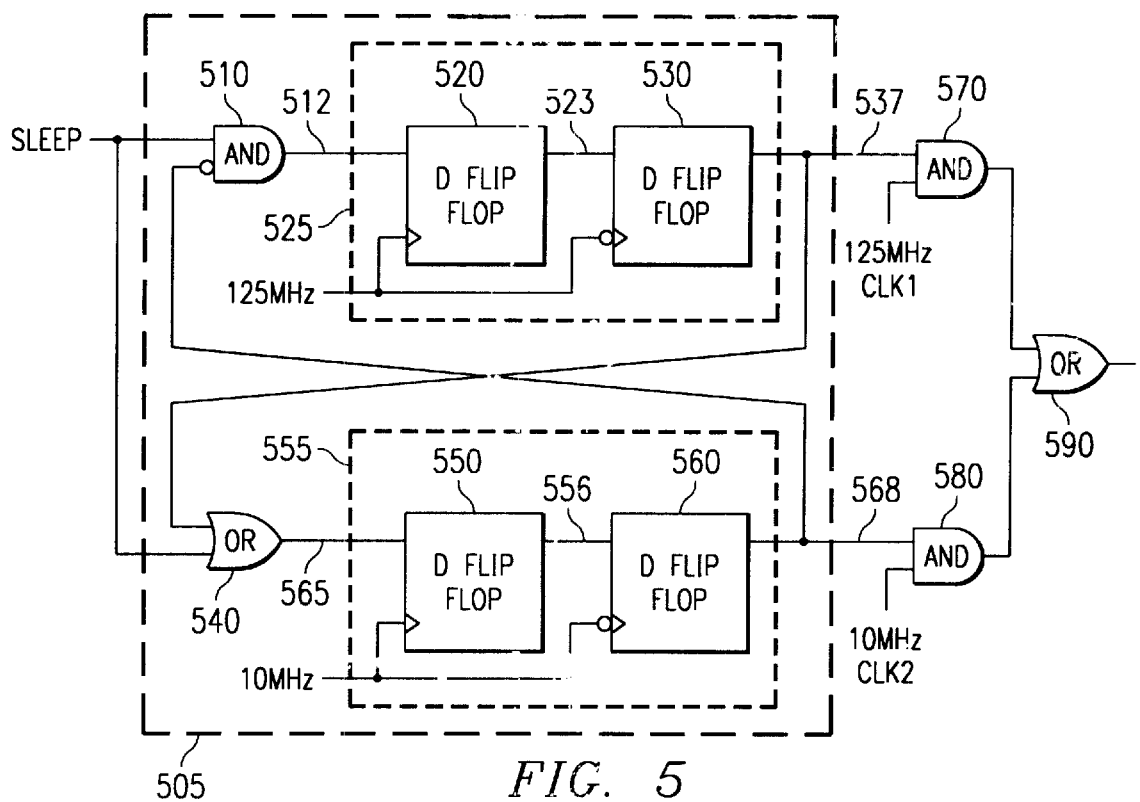
FIG. 5 is a block diagram illustrating the details of another embodiment of a multiplexer in accordance with the present invention.

FIG. 5 is a block diagram of another embodiment of MUX 160 illustrating the details as relevant to an understanding of several aspects of the present invention. MUX 160 is shown containing signal control block 505, AND gates 570 and 580, and OR gate 590. Each component of MUX 160 is described in further detail below.

Signal control block 505 receives a sleep signal and generate the select signals 537 and 568 to AND gates 570 and 580 respectively. The select signals 537 and 568 are generated to be synchronous with the negative edges of the faster and slower clock signal respectively, which causes situation (V) to be avoided. In addition, a feedback path is used to ensure that a logical low to high transition on one path only follows a logical high to low transition, which causes situation (C) to be avoided. An embodiment of signal control block 505 (details shown in FIG. 5) is described below in further detail.

AND gate 570 generates an output by performing a logical AND operation of the faster clock and the corresponding select signal which is synchronized with the negative edge of the faster clock signal. Due to the synchronization, transition of the two inputs do not occur (i.e., situation V avoided) at the same instant, and glitches are not produced at the output of AND gate 570.

Similarly, glitches are avoided at the output of AND gate 580 as well as the corresponding select signal is synchronized with the negative edge of the slower clock signal. Thus, AND gates 570 and 580 respectively generate the faster clock signal and the slower clock signal without glitches when the corresponding select signal is at a high logical level.

OR gate 590 performs an or operation on the two outputs of the AND gates 570 and 580. The manner in which signal control block 505 delays some of the signals to ensure OR gate 590 also generates a glitch free output is described below.

10. Signal Control Block in the Embodiment of FIG. 5

Signal control block 505 is shown containing AND gate 510, synchronizer 525, synchronizer 555 and NOR gate 540. The sleep signal is provided as an input to both the AND gate 510 and NOR gate 540. AND gate 510 receives an inverted output of synchronizer 555 as another input. NOR gate 540 receives the output of synchronizer 525 as another input.

The effect of the connections is to ensure that all 0 to 1 transitions on one of the select lines 537 and 568 follows the 1 to 0 transition on the other select line (as described below with reference to FIG. 6). As a result, no clock signal may be generated on the output of OR gate 590 for a short duration, and such a situation may be acceptable as glitches are avoided in the generated clock signal.

Synchronizer 525 (containing flip-flops 520 and 530) receives the output of AND gate 510 and synchronizes the received output with the negative edge of the faster clock signal. Synchronizer 555 (containing flip-flops 550 and 560) receives the output of NOR gate 540 and synchronizes the received output to the negative edge of the slower clock signal. The outputs of the two synchronizers represent the respective select signal for the two clock signals (faster and slower).

As noted above, signal control block 505 operates to avoid situation (C) by ensuring that the 0 to 1 transition (generated in response to change in sleep signal value) on one of the two select signals follows the 1 to 0 transition on the other signal. The manner in which such result is accomplished is described below in further detail with reference to the timing diagram of FIG. 7.

11. Timing Diagram

Figure 7:
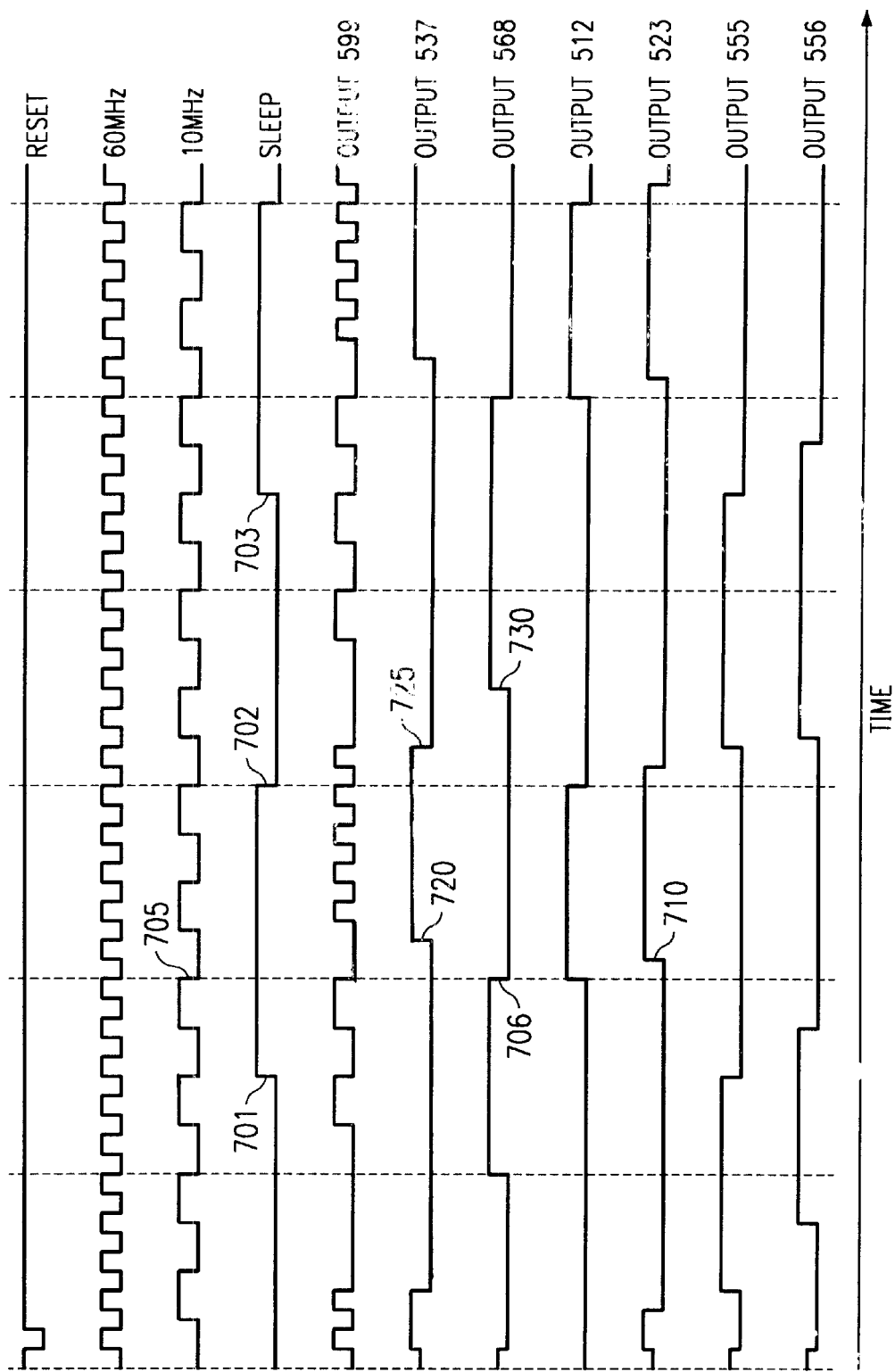
FIG. 7 is a timing diagram representing the various states of signals of another embodiment of a multiplexer.

FIG. 7 is a timing diagram illustrating the timing relationships of various signals generated in the embodiment of FIG. 5. The faster and slower clock signals are respectively labeled as 60 MHz and 10 MHz signals. The select signal is initially shown at a low logical level and successive transitions are shown at time points 701, 702 and 703. The operation of signal control block 505 is described with reference to transitions at 701 (0 to 1) and 702 (1 to 0).

With reference to transition 701, the resulting transition on select line (output) 537 is shown synchronized with a negative edge of the faster clock signal at time point 720. The transition on select line 568 is shown synchronized with a negative edge of the slower clock signal at time point 705. As a result, both the AND gates 570 and 580 generate glitch-free output.

In addition, the transition from 1 to 0 on select line 568 at time point 706 precedes the transition from 0 to 1 at time point 720 on select line 537 due to the operation of the feedback paths 525 and 555. A dead area is present between time points 706 and 720. Also, as the transition of the select signals are synchronized with the negative edges of the corresponding clock signals, the minimum pulse width generated by each AND gate equals the positive pulse width of the corresponding clock signal.

With reference to transition 702, the transitions on select lines 537 and 568 are respectively shown at time points 725 and 730. The transition (1 to 0) at time point 725 on select line 537 precedes the transition (0 to 1) at time point 730. Thus, a dead period is again present between time points 725 and 730, and situation (C) noted above may be avoided. Thus, the present invention can be used to generate glitch free output when selecting from multiple clock signals.

12. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of generating a glitch free output when selecting from a plurality of clock signals, said method comprising:

(a) providing an OR logic gate and a plurality of AND logic gates, each of said OR logic gate and said plurality of AND logic gates comprises an output and a plurality of inputs, wherein the output of each of said plurality of AND logic gates is connected as an input of said OR logic gate;

(b) providing a clock signal and a select signal as two inputs to a corresponding one of said plurality of AND logic gates;

(c) introducing delays into at least one of said select signal and said clock signal corresponding to each one of said plurality of AND logic gates to ensure a desired delay exists between transitions on the corresponding select signal and the clock signal by synchronizing one of said select signal and said clock signal to one edge of a given clock signal and another one of said select signal and said clock signal to another edge of said given clock signal;

(d) introducing delays into at least a plurality of said select signals and said clock signals to avoid the occurrence of a high to low transition on one input followed by low to high transition on another input of said select signal and said clock signal of said OR gate within a desired duration by synchronizing each of said slower clock signal and the select signals corresponding to said faster clock signal and said slower clock signal to an edge of said faster clock signal;

wherein said plurality of clock signals comprise a faster clock signal and a slower clock signal, wherein said method further comprises receiving a sleep signal, wherein one of the two select signals corresponding to said faster clock signal and said slower clock signal is to be set to a high logical level when said sleep signal is at one logical level and another one of said two select signals is to be selected when said sleep signal is at another logical level, wherein said desired delay prevents glitches at the output of each of said plurality of AND gates and wherein said desired duration prevents glitches at the output of said OR gate, and whereby the output of said OR logic gate represents said glitch free output.

2. The method of claim 1, wherein (d) further comprises:
(f) first synchronizing said sleep signal with said slower clock signal, wherein (e) is performed after (f);
(g) using said sleep signal generated by (e) as one of said two select signals.

3. The method of claim 2, wherein (g) comprises using said sleep signal generated by (e) as said select signal associated with said faster clock signal, wherein (e) further comprises synchronizing said sleep signal with a negative edge of said faster clock signal.

4. The method of claim 3, further comprising:
inverting said sleep signal generated in (e) to generate an inverted sleep signal;
synchronizing said inverted sleep signal with a negative edge of said faster clock signal to generate a synchronized inverted signal, wherein said synchronized inverted signal is presented as said select signal for said slower clock signal; and
wherein (e) comprises delaying said slower clock signal based on a number of faster clock signal cycles taken for said sleep signal to be received at said AND logic gate after synchronization in (f), and said slower clock signal being synchronized with a positive edge of said faster clock signal.

5. A method of generating a glitch free output when selecting from a plurality of clock signals, said method comprising:
(a) providing an OR logic gate and a plurality of AND logic gates, each of said OR logic gate and said plurality of AND logic gates comprises an output and a plurality of inputs, wherein the output of each of said plurality of AND logic gates is connected as an input of said OR logic gate;
(b) providing a clock signal and a select signal as two inputs to a corresponding one of said plurality of AND logic gates;

(c) introducing delays into at least one of said select signal and said clock signal corresponding to each one of said plurality of AND logic gates to ensure a desired delay exists between transitions on the corresponding select signal and the clock signal by synchronizing one of said select signal and said clock signal to one edge of a given clock signal and another one of said select signal and said clock signal to another edge of said given clock signal;

(d) introducing delays into at least a plurality of said select signals and said clock signals to avoid the occurrence of a high to low transition on one input followed by low to high transition on another input of said select signal and said clock signal of said OR gate within a desired duration by ensuring that a 0 to 1 transition on one of said two select lines follows a 1 to 0 transition on another select line when a logical value of said sleep signal changes, whereby no clock signal is generated on the output of said AND logic gate between the two transitions;

wherein said plurality of clock signals comprise a faster clock signal and a slower clock signal, wherein said method further comprises receiving a sleep signal, wherein one of the two select signals corresponding to said faster clock signal and said slower clock signal is to be set to a high logical level when said sleep signal is at one logical level and another one of said two select signals is to be selected when said sleep signal is at another logical level, wherein said desired delay prevents glitches at the output of each of said plurality of AND gates and wherein said desired duration prevents glitches at the output of said OR gate, and whereby the output of said OR logic gate represents said glitch free output.

6. A method of generating a glitch free output when selecting from a plurality of clock signals, said method comprising:
(a) providing an OR logic gate and a plurality of AND logic gates, each of said OR logic gate and said plurality of AND logic gates comprises an output and a plurality of inputs, wherein the output of each of said plurality of AND logic gates is connected as an input of said OR logic gate;
(b) providing a clock signal and a select signal as two inputs to a corresponding one of said plurality of AND logic gates;
(c) introducing delays into at least one of said select signal and said clock signal corresponding to each one of said plurality of AND logic gates to ensure a desired delay exists between transitions on the corresponding select signal and the clock signal by synchronizing one of said select signal and said clock signal to one edge of a given clock signal and another one of said select signal and said clock signal to another edge of said given clock signal by synchronizing a first one of said two select signals with a negative edge of said faster clock signal and providing said first one of said two select signals and said faster clock signal to one of said plurality of AND logic gates, and synchronizing a second one of said two select signals with a negative edge of said faster clock signal and providing said second one of said two select signals and said faster clock signal to another one of said plurality of AND logic gates;

(d) introducing delays into at least a plurality of said select signals and said clock signals to avoid the occurrence of a high to low transition on one input followed by low to high transition on another input of said select signal and said clock signal of said OR gate within a desired duration by ensuring that a 0 to 1 transition on one of said two select lines follows a 1 to 0 transition on another select line when a logical value of said sleep signal changes, whereby no clock signal is generated on the output of said AND logic gate between the two transitions;

wherein said plurality of clock signals comprise a faster clock signal and a slower clock signal, wherein said method further comprises receiving a sleep signal, wherein one of the two select signals corresponding to said faster clock signal and said slower clock signal is to be set to a high logical level when said sleep signal is at one logical level and another one of said two select signals is to be selected when said sleep signal is at another logical level, wherein said desired delay prevents glitches at the output of each of said plurality of AND gates and wherein said desired duration prevents glitches at the output of said OR gate, and whereby the output of said OR logic gate represents said glitch free output.

7. A method of generating a glitch free output when selecting from a faster clock signal and a slower clock signal in response to a sleep signal, wherein said sleep signal specifies which one of said faster clock signal and said slower clock signal is to be selected, said method comprising:

receiving said sleep signal, said faster clock signal and said slower clock signal;

synchronizing said slower clock signal to an edge of said faster clock signal to generate a synchronized slower clock signal;

synchronizing said sleep signal to another edge of said faster clock signal to generate a synchronized select signal;

selecting from said faster clock signal and said synchronized slower clock signal according to said synchronized select signal to generate said glitch free output;

generating a inverted synchronized select signal, wherein one of said faster clock signal and said synchronized slower clock signal is selected using said inverted synchronized select signal and another one of said faster clock signal and said synchronized slower clock signal is selected according to said sleep signal.

8. A clock generation circuit generating a glitch free output when selecting from a plurality of clock signals, said circuit comprising:

an OR logic gate and a plurality of AND logic gates, each of said OR logic gate and said plurality of AND logic gates comprises an output and a plurality of inputs, wherein the output of each of said plurality of AND logic gates is connected as an input of said OR logic gate, wherein a clock signal and a select signal are provided as two inputs to a corresponding one of said plurality of AND logic gates;

first means for introducing delays into at least one of said select signal and said clock signal corresponding to each one of said plurality of AND logic gates to ensure a desired delay exists between transitions, said first means for introducing comprises means for synchronizing one of said select signal and said clock signal to one edge of a given clock signal and another one of said select signal and said clock signal to another edge of said given clock signal;

second means for introducing delays into at least a plurality of said select signals and said clock signals to avoid the occurrence of a high to low transition on one input followed by low to high transition on another input of said select signal and said clock signal of said OR gate within a desired duration, said second means for introducing comprising first means for synchronizing each of said slower clock signal and the select signals corresponding to said faster clock signal and said slower clock signal to an edge of said faster clock signal;

second means for synchronizing said sleep signal with said slower clock signal, wherein said second means for synchronizing performs synchronization after synchronization by said first means for synchronization; and means for using said sleep signal generated by (e) as one of said two select signals, wherein said desired delay prevents glitches at the output of each of said plurality of AND gates and wherein said desired duration prevents glitches at the output of said OR gate, whereby the output of said OR logic gate represents said glitch free output, wherein said plurality of clock signals comprise a faster clock signal and a slower clock signal, wherein said circuit further comprises means for receiving a sleep signal, wherein one of the two select signals corresponding to said faster clock signal and said slower clock signal is to be set to a high logical level when said sleep signal is at one logical level and another one of said two select signals is to be selected when said sleep signal is at another logical level.

9. The clock generation circuit of claim 8, wherein said means for using uses said sleep signal generated by first means for synchronizing as said select signal associated with said faster clock signal, wherein said first means for synchronizing synchronizes said sleep signal with a negative edge of said faster clock signal.

10. The clock generation circuit of claim 9, further comprising:

means for inverting said sleep signal generated by said first synchronizing means to generate an inverted sleep signal;

third means for synchronizing said inverted sleep signal with a negative edge of said faster clock signal to generate a synchronized inverted signal, wherein said synchronized inverted signal is presented as said select signal for said slower clock signal; and wherein said first means for synchronization delays said slower clock signal based on a number of faster clock signal cycles taken for said sleep signal to be received at said AND logic gate after synchronization in said second means for synchronization, and said slower clock signal being synchronized with a positive edge of said faster clock signal.

11. A clock generation circuit generating a glitch free output when selecting from a plurality of clock signals, said circuit comprising:

an OR logic gate and a plurality of AND logic gates, each of said OR logic gate and said plurality of AND logic gates comprises an output and a plurality of inputs, wherein the output of each of said plurality of AND logic gates is connected as an input of said OR logic gate, wherein a clock signal and a select signal are provided as two inputs to a corresponding one of said plurality of AND logic gates;

first means for introducing delays into at least one of said select signal and said clock signal corresponding to each one of said plurality of AND logic gates to ensure a desired delay exists between transitions, said first means for introducing comprises means for synchronizing one of said select signal and said clock signal to one edge of a given clock signal and another one of said select signal and said clock signal to another edge of said given clock signal, wherein first means for introducing synchronizes a first one of said two select signals with a negative edge of said faster clock signal and providing said first one of said two select signals and said faster clock signal to one of said plurality of AND logic gates, said first means for introducing further synchronizing a second one of said two select signals with a negative edge of said faster clock signal and providing said second one of said two select signals and said faster clock signal to another one of said plurality of AND logic gates;

second means for introducing delays into at least a plurality of said select signals and said clock signals to avoid the occurrence of a high to low transition on one input followed by low to high transition on another input of said select signal and said clock signal of said OR gate within a desired duration;

wherein said desired delay prevents glitches at the output of each of said plurality of AND gates and wherein said desired duration prevents glitches at the output of said OR gate; and whereby the output of said OR logic gate represents said glitch free output.

12. A clock generation circuit for generating a glitch free output when selecting from a faster clock signal and a slower clock signal in response to a sleep signal, wherein said sleep signal specifies which one of said faster clock signal and said slower clock signal is to be selected, said clock generation circuit comprising:

a first logical AND gate generating a first output by performing a logical AND operation of a first select signal and a slower clock signal;

a second logical AND gate generating a second output by performing a logical AND operation of a second select signal and said faster clock signal;

an OR gate generating said glitch free output by performing a logical OR operation of said first output and said second output received as two inputs; and a signal control block receiving said sleep signal and generating said first select signal and said second select signal based on said sleep signal, said first select signal being generated such that at least a desired delay exists between transitions on said first select signal and said slower clock signal, said second select signal being generated such that at least a desired delay exists between transitions on said second select signal and said faster clock signal, said signal control block further introducing delays into at least two of said first select signal, said second select signal, said slower clock signal and said faster clock signal to avoid the occurrence of a high to low transition on one input followed by low to high transition on another input of said select signal and said clock signal within a desired duration, wherein said signal control block further comprises:

a first synchronizer synchronizing said sleep signal with a negative edge of said faster clock signal to generate said second select signal;

an inverter inverting said second select signal to generate an inverted output;

a second synchronizer synchronizing said inverted output with a negative edge of said faster clock signal to generate said first select signal; and a third synchronizer synchronizing said sleep signal with a negative edge of said slower clock signal to generate an output, wherein the output of said third synchronizer is provided to said first synchronizer; and a fourth synchronizer synchronizing said slower clock signal with a positive edge of said faster clock signal to generate an output, the output of said fourth synchronizer being provided as an input to said first AND gate.

13. A clock generation circuit for generating a glitch free output when selecting from a faster clock signal and a slower clock signal in response to a sleep signal, wherein said sleep signal specifies which one of said faster clock signal and said slower clock signal is to be selected, said clock generation circuit comprising:

a first logical AND gate generating a first output by performing a logical AND operation of a first select signal and a slower clock signal;

a second logical AND gate generating a second output by performing a logical AND operation of a second select signal and said faster clock signal;

an OR gate generating said glitch free output by performing a logical OR operation of said first output and said second output received as two inputs; and a signal control block receiving said sleep signal and generating said first select signal and said second select signal based on said sleep signal, said first select signal being generated such that at least a desired delay exists between transitions on said first select signal and said slower clock signal, said second select signal being generated such that at least a desired delay exists between transitions on said second select signal and said faster clock signal, said signal control block further introducing delays into at least two of said first select signal, said second select signal, said slower clock signal and said faster clock signal to avoid the occurrence of a high to low transition on one input followed by low to high transition on another input of said select signal and said clock signal within a desired duration, wherein said signal control block comprises:

a first synchronizer and a second synchronizer, each generating an output;

a third AND logic gate generating an output by performing an AND logical operation of an inverted value of the output of said second synchronizer and said sleep signal, wherein the output of said third AND logic gate is provided as an input to said first synchronizer; and a NOR logic gate generating an output by performing a NOR logical operation of said sleep signal and the output of said first synchronizer, wherein the output of said NOR logic gate is provided as an input to said second synchronizer, wherein said first synchronizer is designed to generate said first select signal by synchronizing the input to said negative edge of said faster signal, and wherein said second synchronizer is designed to generate said second select signal by synchronizing the input to said negative edge of said slower clock signal; and wherein said signal control block ensures that a 1 to 0 transition on one of said first select signal and said second select signal precedes a 0 to 1 transition on another one of said first select signal and said second select signal, wherein said 1 to 0 transition and said 0 to 1 transition occur in response to a change in value on said sleep signal.

14. A system operating using a slower clock signal when electrical power needs to be saved and using a faster clock signal otherwise, said system comprising:

a processor generating a sleep signal which indicates that said slower clock signal is to be used when said sleep signal is at one logical value, and said faster clock signal is to be used otherwise;

a clock generation circuit for generating a glitch free output by selecting one of said faster clock signal and said slower clock signal, said clock generation circuit comprising:

a first logical AND gate generating a first output by performing a logical AND operation of a first select signal and a slower clock signal;

a second logical AND gate generating a second output by performing a logical AND operation of a second select signal and said faster clock signal;

an OR gate generating said glitch free output by performing a logical OR operation of said first output and said second output received as two inputs; and a signal control block receiving said sleep signal and generating said first select signal and said second select signal based on said sleep signal, said first select signal being generated such that at least a desired delay exists between transitions on said first select signal and said slower clock signal, said second select signal being generated such that at least a desired delay exists between transitions on said second select signal and said faster clock signal, said signal control block further introducing delays into at least two of said first select signal, said second select signal, said slower clock signal and said faster clock signal to avoid the occurrence of a high to low transition on one input followed by low to high transition on another input of said select signal and said clock signal within a desired duration, wherein said signal control block comprises:

a first synchronizer synchronizing said sleep signal with a negative edge of said faster clock signal to generate said second select signal;

an inverter inverting said second select signal to generate an inverted output; and a second synchronizer synchronizing said inverted output with a negative edge of said faster clock signal to generate said first select signal.

15. The system of claim 14, wherein said signal control block further comprises:

a third synchronizer synchronizing said sleep signal with a negative edge of said slower clock signal to generate an output, wherein the output of said third synchronizer is provided to said first synchronizer; and a fourth synchronizer synchronizing said slower clock signal with a positive edge of said faster clock signal to generate an output, the output of said fourth synchronizer being provided as an input to said first AND gate.

16. A system operating using a slower clock signal when electrical power needs to be saved and using a faster clock signal otherwise, said system comprising:

a processor generating a sleep signal which indicates that said slower clock signal is to be used when said sleep signal is at one logical value, and said faster clock signal is to be used otherwise;

a clock generation circuit for generating a glitch free output by selecting one of said faster clock signal and said slower clock signal, said clock generation circuit comprising:

a first logical AND gate generating a first output by performing a logical AND operation of a first select signal and a slower clock signal;

a second logical AND gate generating a second output by performing a logical AND operation of a second select signal and said faster clock signal;

an OR gate generating said glitch free output by performing a logical OR operation of said first output and said second output received as two inputs; and a signal control block receiving said sleep signal and generating said first select signal and said second select signal based on said sleep signal, said first select signal being generated such that at least a desired delay exists between transitions on said first select signal and said slower clock signal, said second select signal being generated such that at least a desired delay exists between transitions on said second select signal and said faster clock signal, said signal control block further introducing delays into at least two of said first select signal, said second select signal, said slower clock signal and said faster clock signal to avoid the occurrence of a high to low transition on one input followed by low to high transition on another input of said select signal and said clock signal within a desired duration;

wherein said signal control block ensures that a 1 to 0 transition on one of said first select signal and said second select signal precedes a 0 to 1 transition on another one of said first select signal and said second select signal, wherein said 1 to 0 transition and said 0 to 1 transition occur in response to a change in value on said sleep signal;

wherein said signal control block comprises:

a first synchronizer and a second synchronizer, each generating an output;

a third AND logic gate generating an output by performing an AND logical operation of an inverted value of the output of said second synchronizer and said sleep signal, wherein the output of said third AND logic gate is provided as an input to said first synchronizer; and a NOR logic gate generating an output by performing a NOR logical operation of said sleep signal and the output of said first synchronizer, wherein the output of said NOR logic gate is provided as an input to said second synchronizer, wherein said first synchronizer is designed to generate said first select signal by synchronizing the input to said negative edge of said faster signal, and wherein said second synchronizer is designed to generate said second select signal by synchronizing the input to said negative edge of said slower clock signal.

17. The system of claim 16, wherein said glitch free circuit is provided as a clock signal driving said processor.

* * * * *